(12) United States Patent
McCutchen (10) Patent No.: US 10,604,704 B2
(45) Date of Patent: Mar. 31, 2020

(54) SHEAR RETORT FOR ABLATIVE PYROLYSIS

(71) Applicant: VORSANA INC, Brush Prairie, WA (US)

(72) Inventor: David J. McCutchen, Portland, OR (US)

(73) Assignee: VORSANA INC, Brush Prairie, WA (US)

(*) Notice: Subject to any disclaimer, the term of this patent is extended or adjusted under 35 U.S.C. 154(b) by 0 days.

(21) Appl. No.: 15/972,657

(22) Filed: May 7, 2018

(65) Prior Publication Data

US 2019/0338193 A1 Nov. 7, 2019

(51) Int. Cl.
| | | |
|---|---|---|
| C10B 1/00 | (2006.01) | |
| C10B 57/00 | (2006.01) | |
| B01J 8/08 | (2006.01) | |
| C10B 1/10 | (2006.01) | |
| C10B 27/00 | (2006.01) | |
| B01D 45/16 | (2006.01) | |
| B03C 3/00 | (2006.01) | |
| B01J 8/00 | (2006.01) | |

(52) U.S. Cl.
CPC ............... *C10B 1/10* (2013.01); *B01D 45/16* (2013.01); *B01J 8/008* (2013.01); *B01J 8/08* (2013.01); *B01J 8/087* (2013.01); *B03C 3/00* (2013.01); *C10B 27/00* (2013.01); *B01J 2208/00769* (2013.01); *C10B 1/00* (2013.01); *C10B 57/00* (2013.01)

(58) Field of Classification Search
CPC ...... C10B 7/02; B01J 8/008; B01J 8/08; B01J 8/087
See application file for complete search history.

(56) References Cited

U.S. PATENT DOCUMENTS

| | | | | |
|---|---|---|---|---|
| 1,503,234 A | * | 7/1924 | Francis | C10B 7/02 202/103 |
| 4,285,773 A | * | 8/1981 | Taciuk | C10G 1/02 201/32 |

(Continued)

OTHER PUBLICATIONS

Peacocke et al., "Ablative Plate Pyrolysis of Biomass for Liquids" Biomass and Bioenergy, vol. 7, No. 1-6, p. 147-154, 1994. (Year: 1994).*

*Primary Examiner* — Jonathan Luke Pilcher
(74) *Attorney, Agent, or Firm* — Miller Nash Graham & Dunn LLP (57) ABSTRACT

A shear retort mill for slow ablative pyrolysis features friction heating between shearing surfaces on a rotating disk and a static or rotating cylindrical drum enclosing the disk. A feed enters the workspace between the rotating disk and the bottom of the drum through a hollow feed shaft coupled to the rotating disk. Preferably, an auger compacts and moves the feed downward, and a shredder reduces the feed's particle size. The feed is increasingly ground and pyrolyzed as it is forced between the drum and disk shearing surface. As the dense processed material extrudes at the edge of the workspace, the gases and liquid products are forced inward by the barrier of dense solids. A static exhaust pipe at the center of the rotating feed shaft allows for the exit of these gases, which preferably go to a heat exchanger to recover any condensable fractions.

20 Claims, 5 Drawing Sheets

(56) References Cited

U.S. PATENT DOCUMENTS

| | | | | |
|---|---|---|---|---|
| 7,438,785 B2* | 10/2008 | Meier | .................... | C10B 47/12 |
| | | | | 201/21 |
| 7,625,532 B2* | 12/2009 | Bridgwater | ............... | B01J 8/10 |
| | | | | 202/100 |
| 7,857,943 B2* | 12/2010 | Noto | ...................... | C10B 47/32 |
| | | | | 201/21 |
| 8,604,259 B2* | 12/2013 | Noto | ...................... | C10B 47/32 |
| | | | | 201/21 |
| 9,011,646 B2* | 4/2015 | McCutchen | ........... | C05F 11/02 |
| | | | | 202/265 |
| 9,851,145 B2* | 12/2017 | McCutchen | ........... | C12N 1/066 |
| 2005/0173237 A1* | 8/2005 | Bridgwater | ............... | B01J 8/10 |
| | | | | 202/100 |
| 2012/0193271 A1* | 8/2012 | McCutchen | ........... | C05F 11/02 |
| | | | | 208/425 |
| 2012/0196336 A1* | 8/2012 | McCutchen | ........... | C12N 1/066 |
| | | | | 435/134 |
| 2012/0266529 A1* | 10/2012 | Scahill | ................... | C10B 47/44 |
| | | | | 44/436 |
| 2014/0325866 A1* | 11/2014 | McCutchen | ........... | C12N 1/066 |
| | | | | 34/267 |
| 2017/0349469 A1* | 12/2017 | McCutchen | ....... | B01D 19/0031 |

* cited by examiner

SHEAR RETORT FOR ABLATIVE PYROLYSIS

FIELD OF INVENTION

The present invention relates to milling equipment, and to reactors for pyrolysis, calcination, or ore processing, especially when gaseous or liquid fractions are recovered from the ground material.

BACKGROUND OF THE INVENTION

The transformation of material by heating, especially in the absence of oxygen, is called pyrolysis. Pyrolyzed wood, for example, produces biochar, which is a useful material both for increasing soil fertility and also burying excess carbon. However, commercial methods have focused on fast pyrolysis, which produces more oil, often of sub-optimal quality, and requires expensive separate drying steps, and methods to separate the solids from the gaseous products. Other smaller scaler methods feature the burning of the hydrocarbon fumes from the pyrolysis in order to generate the required heat. This causes harmful emissions, and also wastes a valuable hydrocarbon product.

Disk mills have long been used to grind material to smaller sizes. Shear pyrolysis, also known as ablative pyrolysis, adds friction for generating heat. A shear reactor has been described by the Applicant in U.S. Pat. No. 9,011,646 "Mechanical Pyrolysis in a Shear Retort." It can be applied to many types of feeds such as biowaste, garbage, coal, ore for solvent mining, coke, waste ash, oil sands and shale. Any mineral content or ash is an asset to the grinding friction, rather than a liability. Supplemental heating elements for such a reactor are part of the Applicant's U.S. Pat. No. 9,851,145 "Radial Counterflow Reactor with Applied Radiant Energy."

However, this shear retort design does not detail how the management of the extrusion of the pyrolyzed material at the disk edges can be used to reuse the heat for pyrolysis, or how an indirect drive method for one of the disk surfaces can be moderated by a brake. The existing design also does not include the enclosure of the extruded material, to retain heat and fumes and prevent fires from the premature exposure of the hot material to oxygen. It also does not describe how a built-in shredder can improve the feed process by reducing the particle size prior to the final pyrolysis. This design also does not address the issues involved with the feed coming in from the top of the device, including how to keep the exhaust gas stream separated from the incoming feed stream.

What is needed is a design with enclosure of the extruded feed, a built-in shredder to improve feed particle size, a separated exhaust gas outlet, and an improved drive mechanism that can be driven by a single motor, and improved temperature control.

SUMMARY

A shear retort mill is here described for slow ablative pyrolysis by friction heating between shearing surfaces, including a rotating disk, and a cylindrical drum enclosing the disk. The drum can be static, or a rotating drum. A workspace is defined by the space between the rotating disk and the bottom of the drum. A feed enters the workspace through a hollow feed shaft coupled to the rotating disk. Preferably, an auger coupled to the feed shaft compacts and moves the feed downward, and then a shredder is used to reduce the feed's particle size before it enters the pyrolysis workspace.

The feed is increasingly heated and subjected to pressure and grinding as it moves from the center of the workspace to the narrow passage between the drum and disk shearing surfaces at the edge of the workspace. At higher temperatures and pressures, in the absence of oxygen, this causes a pyrolysis reaction. The gases and liquids that are produced by this pyrolysis are forced inward by the barrier created by the seal of dense pyrolyzed solids products being created at the edge of the workspace. A static exhaust pipe at the center of the rotating feed shaft allows for the exit of these gases, and a central liquids drain in the drum allows for the exit of any remaining liquids such as oil. The exhaust gases preferably go to a heat exchanger to recover any condensable fractions, such as water from steam or oil from hydrocarbon vapors.

The motion of the spinning disk and the pressure of the incoming feed will force it into the pyrolysis zone of the workspace, and make the hot pyrolyzed solids material be continuously extruded from the edge of the disk, and accumulate in the drum storage space in the interior of the drum. As this accumulated material level rises in the drum, it will also cover the upper surface of the rotating disk within the drum. This covering layer keeps the rotating disk hot, both by direct transfer of heat from the hot material, and also by heat insulation to prevent the disk from losing heat. After the optimal level of solids in the drum is reached, the excess product is continuously extruded from the drum. The final product extrusion is allowed to cool until it no longer poses a threat for fire or explosion when exposed to oxygen.

A motor drives the rotation of the disk, and that rotation can be transferred by pressure and friction to cause the motion of a rotating drum, in the manner of a clutch. A brake mechanism is used to partially arrest the rotation of the rotating drum, so that there is a difference of rotation speed between the disk and the drum. This difference of rotation speed produces shear and friction, which is intended to be the primary cause of the heat for pyrolysis. Supplemental heating, such as from burners underneath the drum, or electrical resistance elements built into the disk or drum, can also help establish and maintain the best pyrolysis temperature, in combination with the friction heating. Supplemental cooling such as from water lines incorporated into the disk or drum, can also be used to lower the temperature of the workspace. Special sacrificial wear plates can be built into the disk and drum at the shear surfaces to allow for easy maintenance replacements.

DETAILED DESCRIPTION

Figure 1:
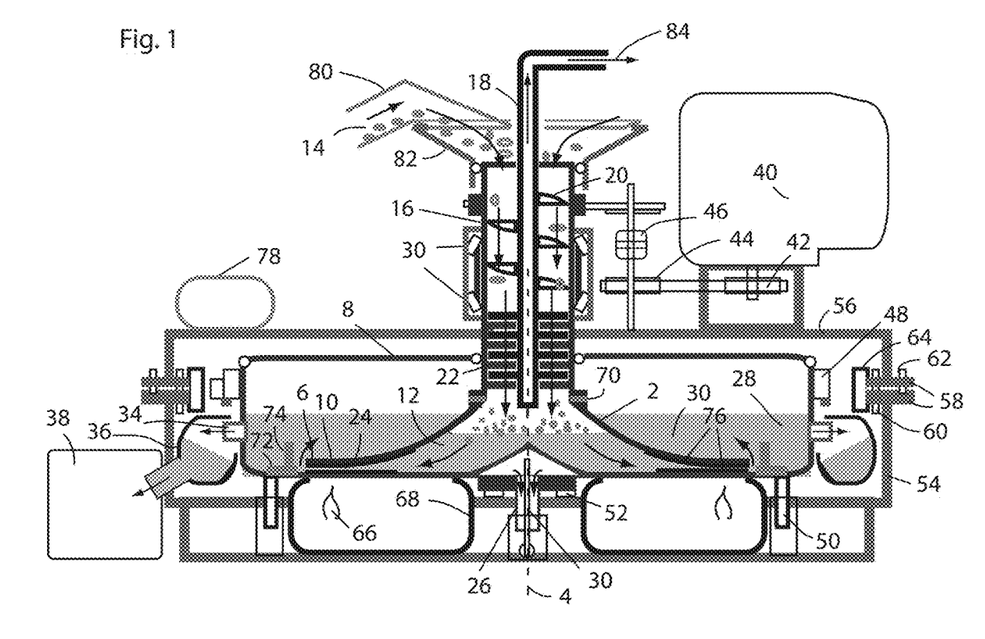
FIG. 1 shows a cross section of the Shear Retort design.

The shear retort processor here shown in FIG. 1 includes a rotating disk 2 with a conical flared cross section centered on an axis of rotation 4. The flare shape of the disk increasingly flattens in profile as it extends toward the periphery of the disk 6, where it is especially close to an enclosing drum 8, which is shown here as having a flat bottom. This close distance 10 is where there the maximum shear and grinding on the feed will take place. If the closest shear surfaces on the disk and drum are parallel, then there will be a region with this close distance where the maximum shear will take place.

A workspace 12 is defined by the space between the rotating disk 2 and the bottom of the drum 8, extending radially from the axis of rotation 4 to the disk periphery. A feed 14 enters the workspace 12 through a rotating hollow feed shaft 16 coupled to the rotating disk 2. A static exhaust pipe 18 is centered on the axis of rotation 4 at the center of the feed shaft 16 and extending downward to the workspace 12. Preferably, the feed is from the top down, between the walls of the feed shaft 16 and the static exhaust pipe 18. The motion of the feed is preferably assisted by one or more flights of an auger 20 coupled to the feed shaft 16. This feed auger 20 compacts and moves the feed downward, preferably toward a shredder 22 which serves to reduce the feed's particle size before it enters the pyrolysis workspace 12. This shredder 22 is comprised of alternating vertical layers of teeth, also shown from above in FIG. 5, that are alternately coupled in a vertical sequence to the rotating feed shaft 16, and then the static exhaust pipe 18, so that they will serve to cut the feed 14 into smaller pieces as the feed moves through the sequence of passing teeth.

The feed is increasingly heated and subjected to pressure and grinding as it moves from the center of the workspace 12 outward to the narrowing passage between the drum and disk at the edge of the workspace 12, which is the maximum pyrolysis zone 24. The grinding of the increasingly dried and brittle feed breaks it apart into even smaller fragments, and releases heat energy from the friction and breaking of the material. This increasing heat and pressure in this pyrolysis zone 24, in the absence of oxygen, causes a pyrolysis reaction releasing gases and liquid fractions, in addition to the remaining pyrolyzed solids, which for organic material are rich in carbon. The pyrolyzed solids at the narrowest portion of the workspace, prior to their extrusion, form a dense barrier preventing the produced gases and liquids from escaping at the edge of the workspace. Instead, these gases and liquids are forced inward toward the axis of rotation 4. There the gases exit through the static exhaust pipe 18, while a central liquids drain 26 in the drum 8 allows for the exit of any remaining liquids such as oil. The exhaust gases go to a heat exchanger to recover any condensable fractions, such as water from steam or oil from hydrocarbon vapors.

The motion of the spinning disk causing centrifugal force, as well as the pressure of the incoming feed, both force the hot pyrolyzed solids material to be continuously extruded from the edge of the disk 6 to accumulate in the drum storage area 28 in the interior of the drum 8 outside of the disk and the workspace. The force of the pyrolyzed material being ejected from the workspace is opposed by the accumulated material already there, so the pyrolyzed material in the drum storage area remains relatively dense. As the accumulated pyrolyzed material level rises in the drum, it will also cover the upper surface of the rotating disk 6 within the drum 8. This covering layer 30 keeps the rotating disk 6 hot, both by direct transfer of heat from the hot material where it is hotter than the disk, and also by acting as heat insulation to prevent the any hotter portions of the disk 6 from losing heat. As the optimal level of solids in the drum is reached, the excess pyrolyzed solids product 32 is continuously extruded from the drum 6 through one or more solids outlet ports 34. Having the drum rotate will help move the pyrolyzed material to the outer rim of the drum to be offloaded. The solids outlet ports that are part of the rotating drum 8 can empty into a receptacle such as a static concentric output trough 36 which in turn empties into a solids container 38. The final product extrusion is allowed to cool until it no longer poses a threat for fire or explosion when exposed to oxygen. This cooling can be assisted by water jackets or water spray against the walls of the drum, any pipes used for solids, the output trough 36 or the solids container 38, and the exposure to oxygen can be minimized by pumping in nitrogen or some other harmless gas to reduce the net oxygen level in any enclosure with the hot material.

A rotation motor 40 drives the rotation of the disk, and that rotation can be transferred by pressure and friction to cause the motion of the rotating drum, in the manner of a clutch. The rotation motor 40 produces motive force for rotation through a linkage such as a chain or belt drive 42 engaging the feed shaft 16 and the rotating disk 6. The motor can be any suitable source of mechanical force, such as an electric motor or an internal combustion motor, or a water or wind turbine. Here a clutch and gear reducer 44 is shown as well as a fail-safe release 46 that disengages the drive chain if there is a sudden jam such as in the shredder teeth. For safety and to keep soot and dirt from degrading performance, the gears and drive mechanism should be enclosed.

A brake mechanism 48 can partially arrest the rotation of a rotating drum, so that there is a difference of rotation speed between the disk and the drum. This difference produces the shear and friction which is intended to be the primary cause of the heat for pyrolysis. The brake mechanism can be any means for arresting rotary motion, such as a friction element such as one or more cables or straps under tension creating a chord that puts pressure against the outer drum surface, or one or more brake shoes pressing against the rotating surface. It can also be a gear engaged in a gear track included in the rotating surface, with the braking elements applied to the gear, which thereby transfers the braking energy to the track. The mechanical energy of the braking can be applied to a useful purpose, such as having the gear or a moving tensioned cable turn a generator, and the magnetic resistance will form part of the braking force.

The rotating drum is supported by wheeled elements, such as the outer wheels 50 and a thrust bearing 52. This Shear Retort design is comprised of an upper part and a lower part. The lower part comprises the elements of the static or rotating drum and its supporting frame 54, and the upper part comprises the upper frame 56 supporting the motor 40, the disk 6 and their other associated elements. The upper and lower parts meet at multiple parallel junction plates 58 within a junction plate assembly comprising parts such as a registration pin 60, a spacing screw 62, and a locking and pressure mechanism 64 to make sure the two parts can be locked together or adjusted to increase or decrease the pressure between the disk 6 and the drum 8.

Supplemental heating may be needed to supplement the heat of friction to establish or maintain the proper operating temperature. This supplemental heating can come from burners 66 located underneath the drum, or electrical resistance elements such as resistance coils, similar to those used for oven burners, built into the disk or drum, with the power supplied by means such as a slip ring. A rotating drum will allow heat from a localized burner to be more evenly distributed. An insulated oven enclosure 68 underneath the drum can help retain the heat from the burner or drum for more energy efficiency. For energy efficiency, it is important to keep the heat in the key areas of the disk and drum and prevent it from being conducted into the frame and other elements of the device. Accordingly, there should be a heat-insulating section 70 made of a suitable gasket material between the disk 6 and the drum 8, and a heat-insulating section 72 in the bottom of the drum to prevent the heat from spreading. To slow the spread of the pyrolyzed material outward from the disk periphery, a rim wall barrier 74 should be located just outside the disk periphery, to increase the density of the pyrolyzed material there and prevent the escape of liquids and gases from the workspace.

Figure 4:
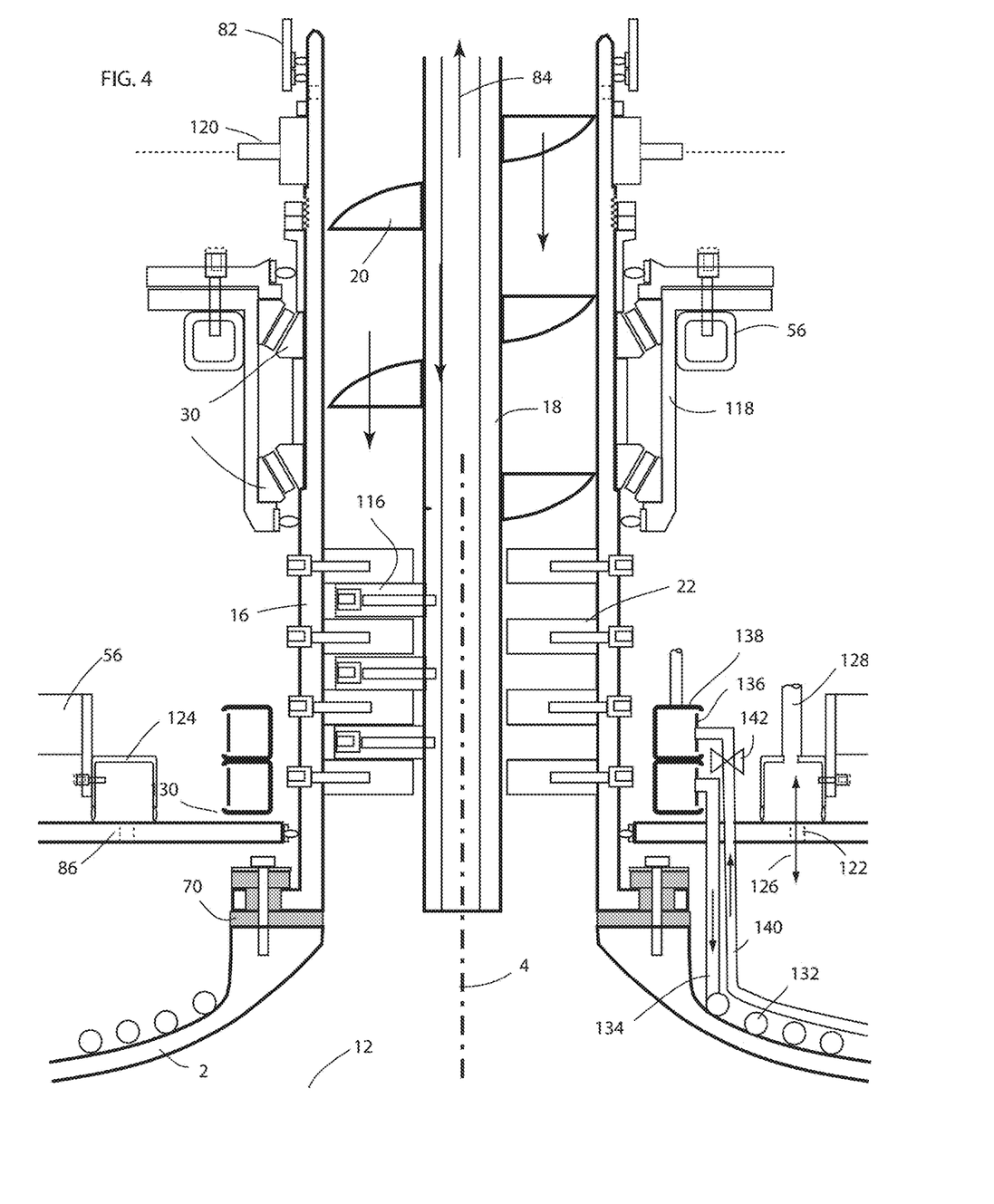
FIG. 4 shows detail of the feed shaft assembly.

Similarly, supplemental cooling can be used to lower the temperature of the, such as by water lines built into the disk or drum to carry away excess heat, as is shown in FIG. 4.

Returning to FIG. 1, for the shear surfaces on the disk and drum facing the pyrolysis zone 24, special sacrificial wear plates 76 should be coupled to the disk and drum at these maximum friction zones to allow longer operating life and for maintenance replacements. These wear plates can be a suitable high-wear refractory material, such as the durable coatings such as the Magnaplate 10K™ produced by General Magnaplate and Hexoloy® produced by Saint-Gobain, as baked onto detachable plates made to be secured to the disk and drum surfaces facing the pyrolysis zone 24.

In this example design, the top half of the device, including the disk 6, is pressed down against the bottom of the drum 8, and in order to balance the load, offsetting the weight of the motor and other elements, a counterweight 78 can be used.

The feed elements include a feed chute 80 leading to a feed hopper 82 which couples by a rotary seal to the feed shaft 16. To prevent damage to the shear retort, metal should be removed from the feed stream by a magnetic screen near the feed chute. One suitable design is a rotating cylindrical comb wheel located above the feed chute with radiating sets of magnetic tines; as the successive tines are pushed by the motion of the feed on the feed chute, they comb first through the feed material and are then forced up and overhead, where the tines pass through slots that strip off and separate any metal attached to them.

Figure 2:
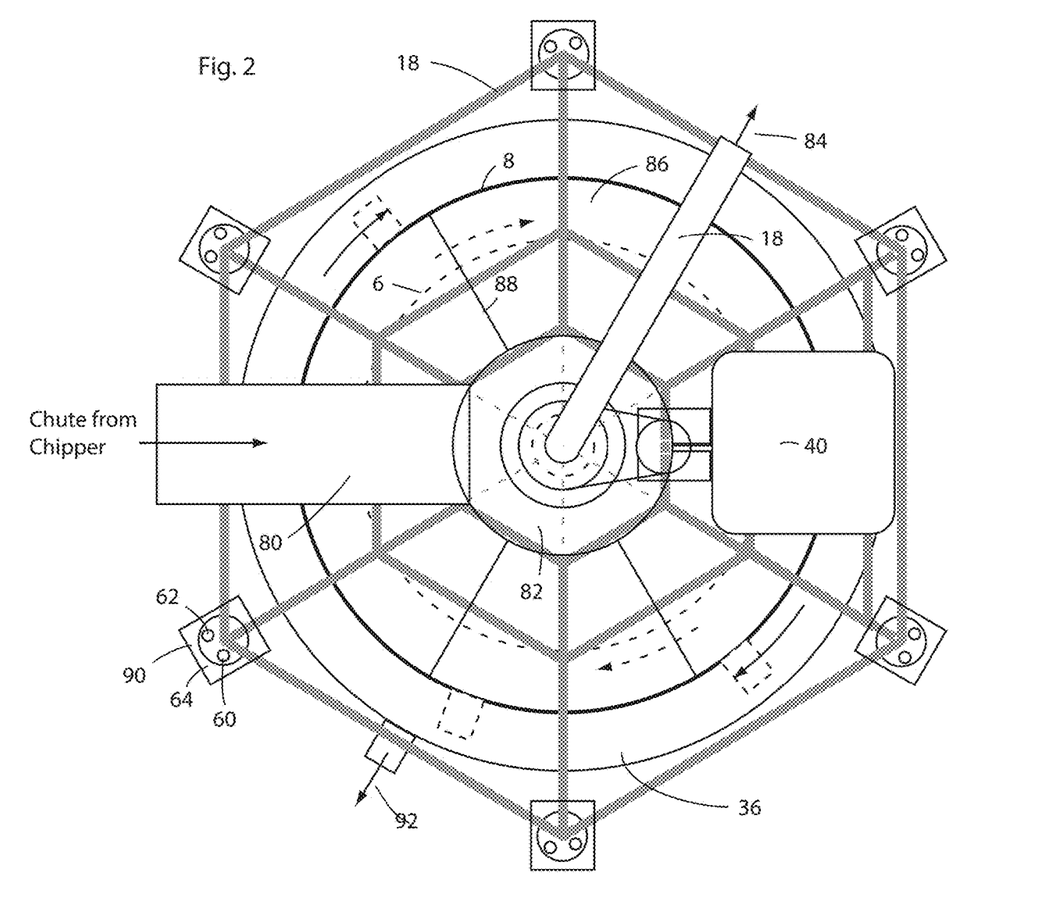
FIG. 2 shows a top view of this Shear Retort design.

The exhaust elements for gases include the static exhaust pipe 18, which leads to a heat exchanger (shown in FIG. 2). The static exhaust pipe 18 is solidly locked to the device's top frame, to maintain the alignment for the shredder elements attached to it and to prevent twisting due to the other opposing shredder elements attached to the rotating feed shaft. Adding a cyclone and particle filter for the exhaust gases 84 prior to their entry into the heat exchanger is preferred to prevent the pipes from clogging, especially for inherently dusty processing like coal, biomass or ore.

A top view of this example design is shown in FIG. 2. In this case there is a hexagon design for the frame, with three equally spaced corner support points forming a defined plane. The feed chute 80 leads to the feed hopper 80, and the concentric static exhaust pipe 18 is anchored to the top frame. A lid 86 covers the top of the drum 8. Preferably this lid is comprised of sealable sections, such as pie-shaped sections with compressible seals 88 around their rims, to make the covered interior of the drum relatively airtight while still allowing the lid to be opened for access and maintenance. The upper part and the lower part of the device meet at the junction plate assembly 90, which comprises parts such as a registration pin 60, a spacing screw 62, and a locking and pressure mechanism 64. The extruded processed material exits into a concentric output trough 36 and then as a processed material stream 92 which is then immediately used or stored in a solids container 38.

Figure 3:
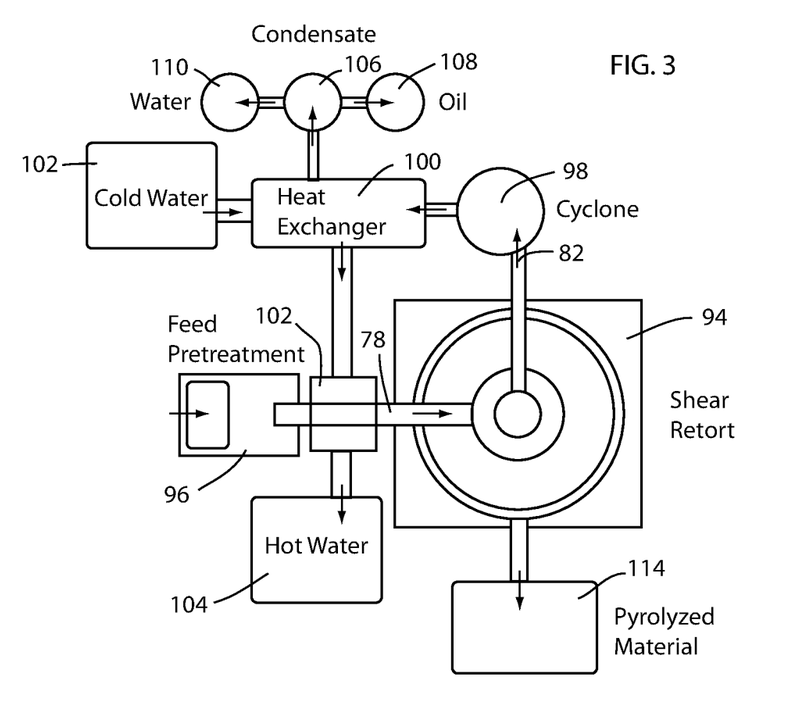
FIG. 3 shows a system diagram of the components for processing an organic feed.

An overview of typical system components is shown in FIG. 3. The Shear Retort 94 is fed by a feed pretreatment device 96 such as a shredder for biomass, or a crusher for ore. This pretreatment device feeds into the Shear Retort 94 via a feed chute 78. The exhaust gases 82 here go first to a cyclone 98 and then to a heat exchanger 100. The cyclone is used to separate out the particulate matter from the gas stream; an electrostatic precipitator can also be used to attract and clean out particles. The heat exchanger can be a plate or tube water-cooled design, or any other suitable heat exchanger to remove the heat from the emission stream. Here the water for the heat exchanger is supplied from a cold water tank 102 and goes after heating to a hot water tank 104. In the heat exchanger, the gases are cooled to allow for condensable fractions to be recovered in liquid form. For example, in a biomass system, the cooled smoke produces a condensate stored in a condensate tank 106 comprising water and oil, which naturally separate so they can be drawn off into separate oil 108 and water 110 storage tanks. If the recovered water is of sufficient quality, it can be used as make-up water into the cold water tank. For energy efficiency, the heat from the hot water can be used to help dry the feed, such as by enclosing the feed chute 78 in a drying chamber 112 whose walls contain hot water pipes or other channels for radiating heat. The processed solid material coming out of the Shear Retort 94 goes to a processed material storage container 114.

Some details of the feed shaft assembly for the illustrated design are shown in FIG. 4. A feed hopper 82 is coupled by one or more rotary seals to the hollow feed shaft 16, which is coupled to the rotating disk 2 with heat-insulating material 70 between. A feed auger 20 is coupled to the interior of the hollow feed shaft to assist the feed into the workspace 12, and the rotating teeth of a shredder 22 are also anchored to the interior of the hollow feed shaft 18, with opposing interspersed static shredder teeth 116, which are also anchored to the static exhaust pipe 18 by shear-resistant bolts and machined mounts. For clarity, the static shredder teeth are omitted here on the right side. The hollow feed shaft is supported by bearings, in this case opposed conical bearings, within a bearing box 118 which is supported by the upper frame 56. The hollow feed shaft 16 is rotated on the axis of rotation 4 by a chain or belt drive coupled to a drive wheel 120. The lid of the drum 86 should have vent holes 122 underneath a static vent torus 124 anchored to the upper frame 56. These vent holes allow for the passage of gases 126 to or from the processed material in the drum. Fumes from the processed material can escape through these holes into the vent torus into a pipe 128 which can join the main exhaust pipe 18. The vent holes also allow for the injection of cooling water or fire suppression gases such as $CO_2$ or nitrogen into the drum. Rotary seals 130 will allow for hermetic sealing of the vent torus to the upper surface of the lid of the drum 86 even when the drum is rotating.

Supplemental heating or cooling of the disk can also be added. The junction to the heating or cooling elements should be by means that allow the junction of the rotating drum and disk elements with the static frame and other static elements. A heating system can be through the addition of a coil or grid 132 of electrical resistance wire in contact with the disk 2, powered by a feed line 134 from a sliding cylindrical element 136 slip ring contact in electrical contact with a static torus 138. The return line 140 here is for the ground. Similarly, a cooling system could use water lines fed through a feed line 134 coupled to a waterproof sliding cylindrical element 134 in a static torus 138. The return line 140 of hot water would be pumped by the centrifugal force of the spinning disk driving the water outward through the cooling grid. A valve 142 is used to regulate the flow.

Figure 5:
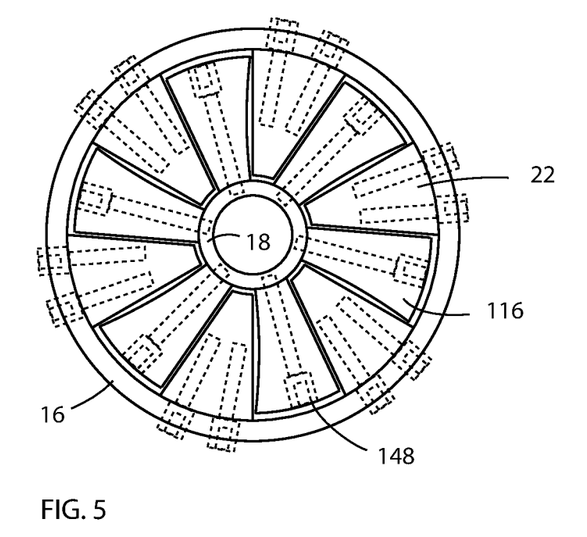
FIG. 5 shows a top level view of the teeth in the shredder.
Figure 6:
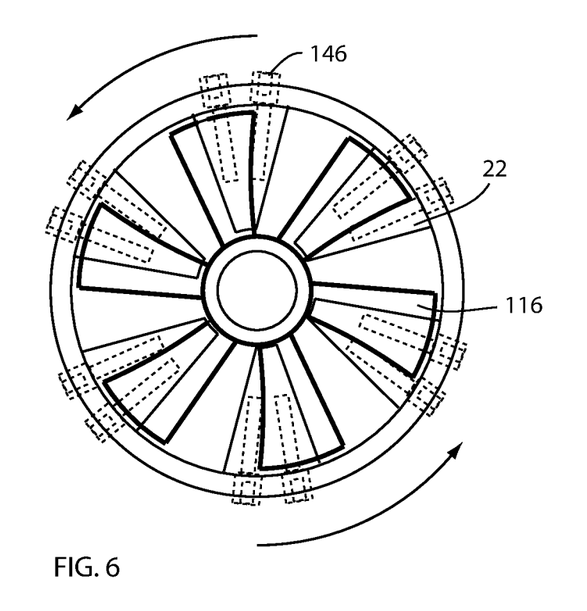
FIG. 6 shows a top view of the teeth during rotary operation.

A top view of a design for the shredder teeth is shown in FIG. 5. The rotating shredder teeth 22 are anchored to the inside of the hollow feed shaft 16 and are interspersed with the static shredder teeth 116 attached to the static exhaust pipe 18. The pictured arrangement is the alignment that allows for the two sets to be pulled apart vertically. FIG. 6 shows the shredder in rotation, where the passing edges of the rotating shredder teeth 22 and the static shredder teeth 116 work together to comminute the feed, while the gaps allow the feed to continue to move downward. The direction of rotation is shown at 144. The bolts for the static shredder teeth are shown at 146, and the bolts for the rotating shredder teeth are shown at 148.

The shear retort of the present disclosure can be built in many different sizes to suit a particular purpose, and be constructed of a wide range of materials. As a type of mill, it can be used for simply grinding the feed or causing simultaneous pyrolysis by operating at higher temperatures and pressures in the workspace. If the shear retort is used at lower temperatures and pressures, it will grind and heat the feed without causing as much pyrolysis. It can be used for processing many types of feeds such as agricultural products or waste, wood and wood waste, manure and other bio-waste, garbage, coal, coke, waste ash, ore used in solvent mining, oil sand and oil shale. It also relates to reactors for pyrolysis, calcination, or ore processing, especially when gaseous or liquid fractions are recovered from the ground material.

From the foregoing list, it should be clear that the simple device in the present disclosure is useful in solving a number of problems in various fields of use. Therefore the following claims are generally drawn to the device itself and are not limited by fields of use. Other fields of use than those mentioned here are also intended to be covered by the present disclosure, as well as such equivalents and modifications as may be obvious to those of ordinary skill in the arts to which the invention pertains. The mention of specific fields of use and specific embodiments is not intended to exclude others not mentioned.

The invention claimed is:

1. A shear retort processor apparatus for slow ablative pyrolysis, comprising:
    a rotating disk with a shearing surface centered on an axis of rotation and having a flared conical profile;
    a drive motor coupled to the rotating disk to produce disk rotation on said axis of rotation;
    a cylindrical drum having a drum interior and enclosing said rotating disk, the drum also centered on said axis of rotation, and having a shearing surface facing said shearing surface of said rotating disk;
    a workspace defined by a space between the shearing surface of the rotating disk and the shearing surface of the drum;
    a hollow feed shaft coupled to the rotating disk and centered on said axis of rotation, the feed shaft configured to receive a feed introduced into the hollow feed shaft and pass the feed into the workspace to produce pyrolyzed solid material, gaseous emissions and liquid fractions;
    a static exhaust pipe centered on said axis of rotation, extending downwards into said workspace and upwards beyond said feed shaft, and serving as a conduit for the exhaust of gaseous emissions; and
    a drum storage area located in the interior of the drum and peripheral to the workspace and the rotating disk, where the pyrolyzed solid material accumulates after being extruded from the periphery of the workspace, with the accumulation being sufficient to cover at least part of an upper surface of the rotating disk.

2. The apparatus of claim 1, wherein the drum is rotatable on said axis of rotation, and said disk rotation causes the rotation of the drum.

3. The apparatus of claim 2, wherein a brake is used to slow the rotation of the drum.

4. The apparatus of claim 3, wherein said brake comprises a brake shoe contacting the surface of the drum.

5. The apparatus of claim 3, wherein said brake comprises a tensioned cable in contact with the surface of the drum.

6. The apparatus of claim 5, wherein said tensioned cable is also coupled to a generator.

7. The apparatus of claim 1, wherein an auger is coupled to the interior of the feed shaft to compact and move the feed downward toward the workspace.

8. The apparatus of claim 1, wherein a shredder comprising shredder teeth coupled to the interior of the feed shaft reduces the particle size of the feed before it enters the workspace.

9. The apparatus of claim 8, wherein the shredder comprises shredder teeth coupled to the static exhaust pipe.

10. The apparatus of claim 1, wherein a central liquid drain is arranged in the drum to allow for the exit of accumulated liquids from the workspace.

11. The apparatus of claim 1, wherein said gaseous emissions flow to a heat exchanger to recover condensable fractions.

12. The apparatus of claim 11, wherein said gaseous emissions flow to a cyclone for removal of particulates before the gaseous emissions flow to said heat exchanger.

13. The apparatus of claim 11, wherein said gaseous emissions flow to an electrostatic precipitator for removal of particulates before the gaseous emissions flow to said heat exchanger.

14. The apparatus of claim 1, further comprising an output trough such that processed solid material is extruded from the drum through the output trough.

15. The apparatus of claim 1, wherein supplemental heating is used to increase the temperature of the workspace.

16. The apparatus of claim 15, wherein gas burners are located under the drum.

17. The apparatus of claim 15, wherein electrical resistance heating wire is built into the disk or drum.

18. The apparatus of claim 1, wherein heat-insulating sections are included in the rotating disk and the drum.

19. The apparatus of claim 1, wherein said shear surfaces of the disk and drum comprise sacrificial wear plates.

20. The apparatus of claim 1, wherein a static feed hopper is coupled by a rotary seal to the hollow feed shaft.

* * * * *